United States Patent [19]

Shikata et al.

[11] Patent Number: 5,187,605
[45] Date of Patent: Feb. 16, 1993

[54] OPTICAL TRANSCEIVER

[75] Inventors: Kiyotaka Shikata, Kawasaki; Shinji Takao, Fukuoka, both of Japan

[73] Assignee: Fujitsu Limited, Kawasaki, Japan

[21] Appl. No.: 754,940

[22] Filed: Sep. 4, 1991

[30] Foreign Application Priority Data

Sep. 6, 1990 [JP] Japan .................................. 2-238591

[51] Int. Cl.$^5$ ........................ H04B 10/00; H04J 14/08
[52] U.S. Cl. ..................................... 359/152; 359/136; 370/85.3
[58] Field of Search ............... 359/118, 119, 136, 152, 359/111, 113, 174; 370/85.1, 85.3; 375/7

[56] References Cited

U.S. PATENT DOCUMENTS

| 4,476,467 | 10/1984 | Terwilliger | 370/85.2 |
| 4,481,626 | 11/1984 | Boggs et al. | 359/136 |
| 4,701,909 | 10/1987 | Kavehrad et al. | 370/85.3 |
| 4,751,700 | 6/1988 | Ulug | 370/85.13 |
| 4,809,361 | 2/1989 | Okada et al. | 359/111 |

FOREIGN PATENT DOCUMENTS

| 0170208 | 2/1986 | European Pat. Off. . |
| 0224132 | 6/1987 | European Pat. Off. . |
| 0126727 | 6/1987 | Japan | 359/136 |

Primary Examiner—Edward L. Coles, Sr.
Assistant Examiner—Kinfe-Michael Negash

[57] ABSTRACT

An optical transceiver is coupled to a U-shaped optical bus and to data terminals employing CSMA/CD. The optical transceiver includes a converter for carrying out a conversion between data to and from the data terminals and transmitting packets to be transmitted from and receiving packets to be received by the data terminals via the converter, an optical bus interface for matching the transmitting and receiving packets to the U-shaped optical bus which is used as a transmission line, a common bus which provides a data transfer path between the converter and the data terminals during transmitting and receiving operations, a transmitting packet intermission part for intermitting the transmitting packets in response to a transmission control signal, a receiving packet intermission part for intermitting the receiving packets in response to a reception control signal, and a controller for generating the transmission control signal and the reception control signal based on timings of the transmitting packet and the receiving packet, a relationship between the transmitting packet and a corresponding receiving packet which is looped back from the U-shaped optical bus, and a collision notification. The converter notifies a collision on the common bus based on an impedance of the common bus by supplying the collision notification to the controller.

14 Claims, 7 Drawing Sheets

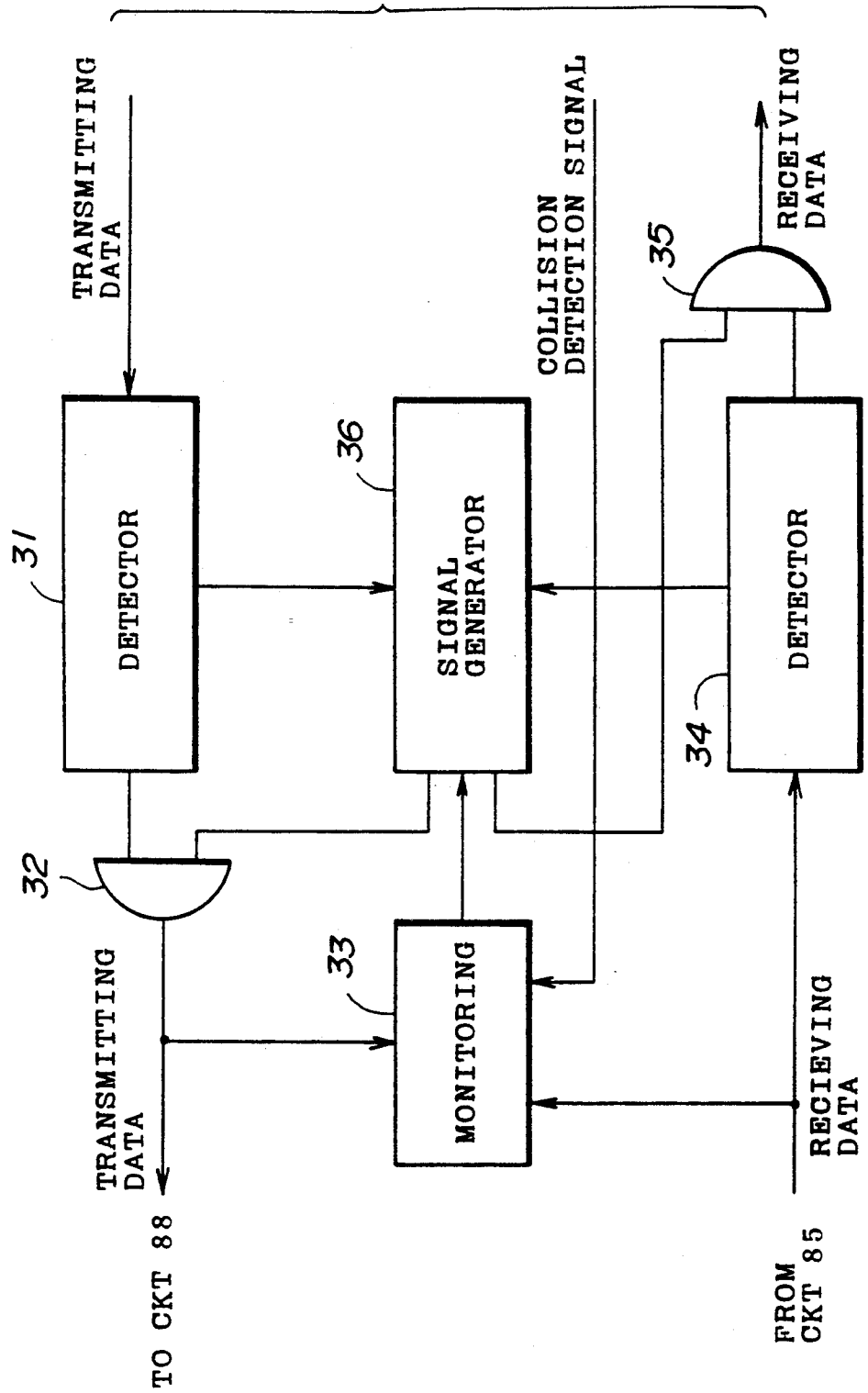

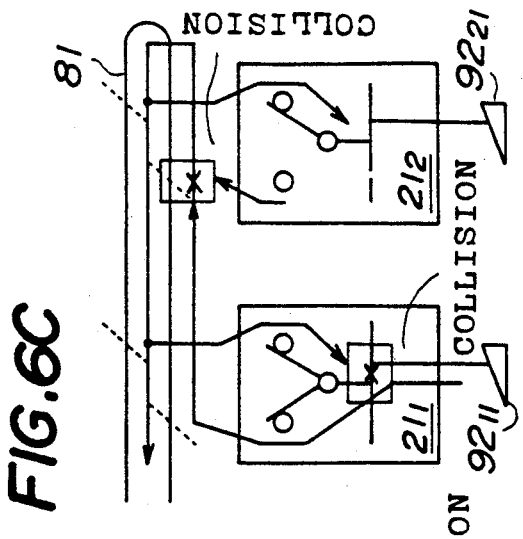 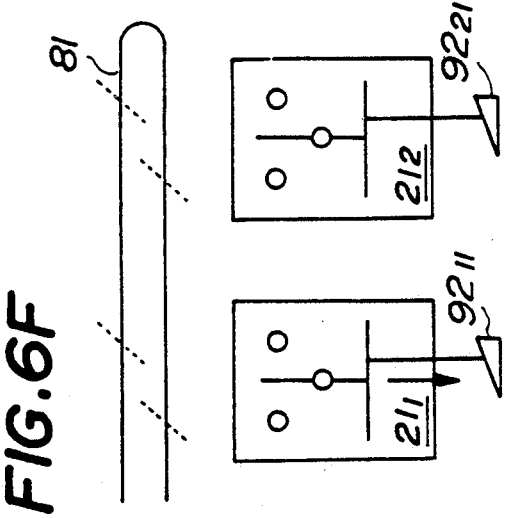
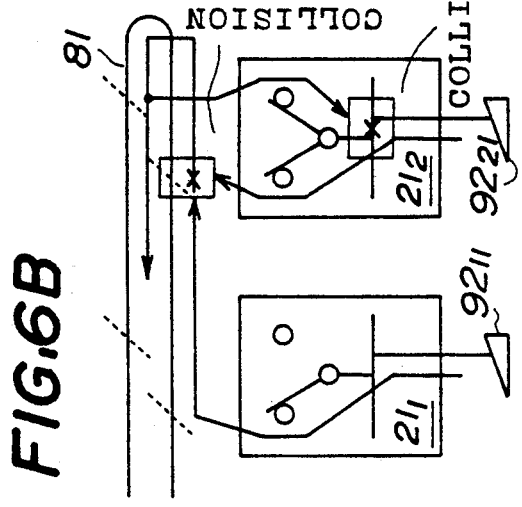 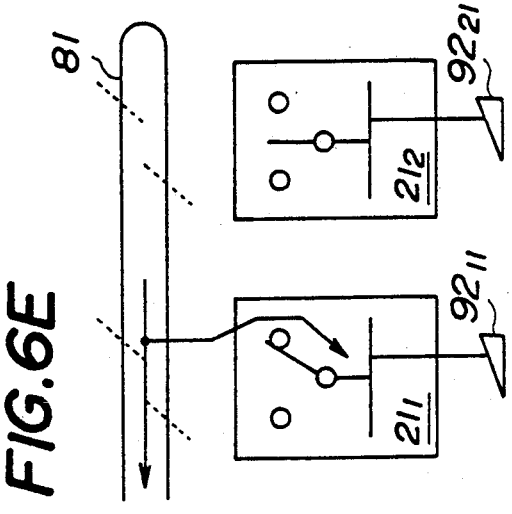
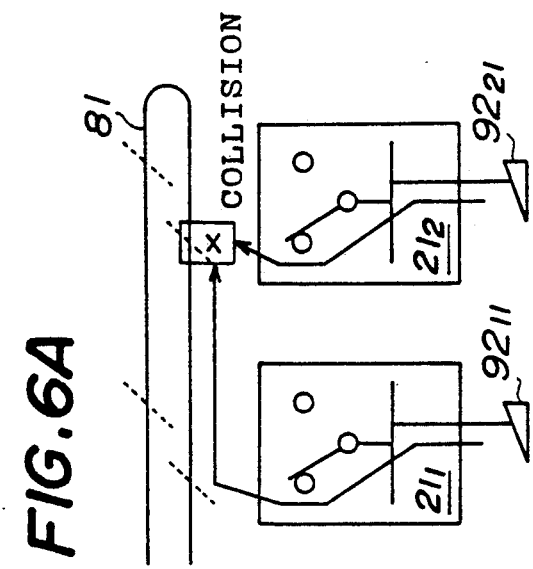 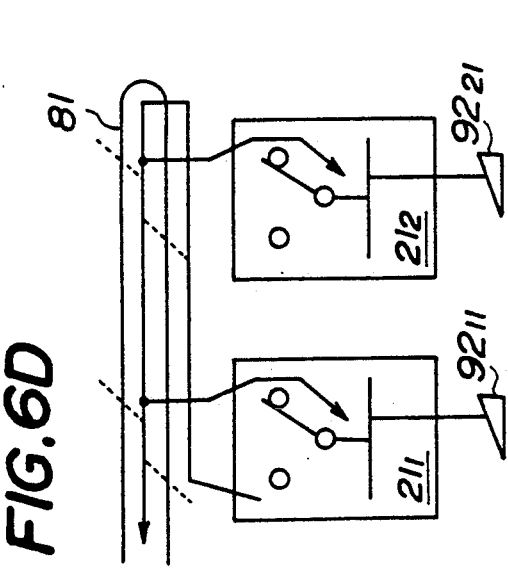

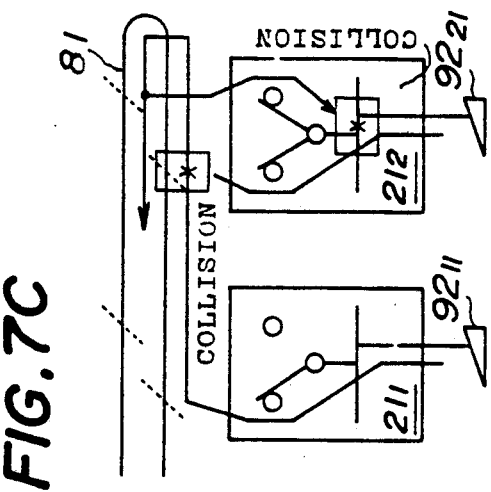
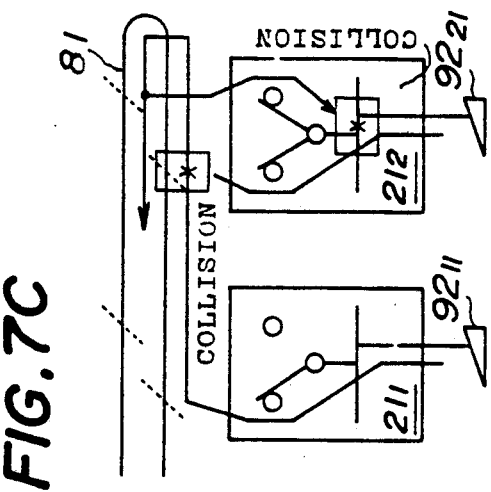
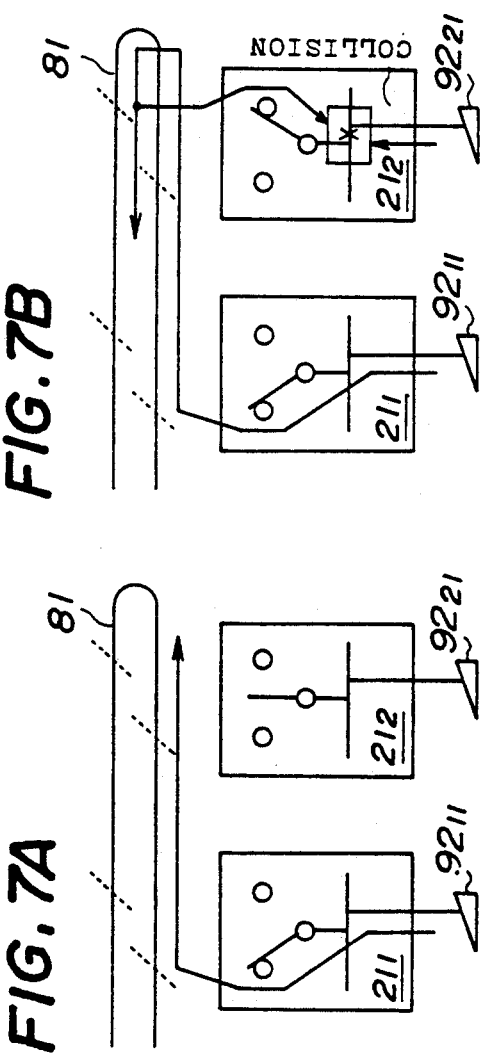
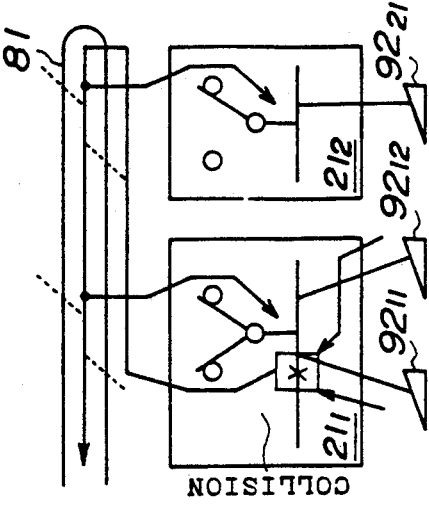
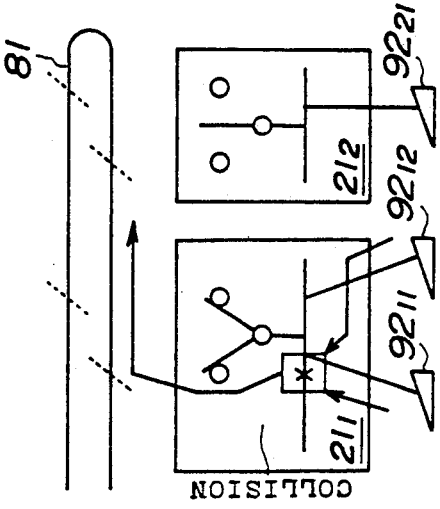
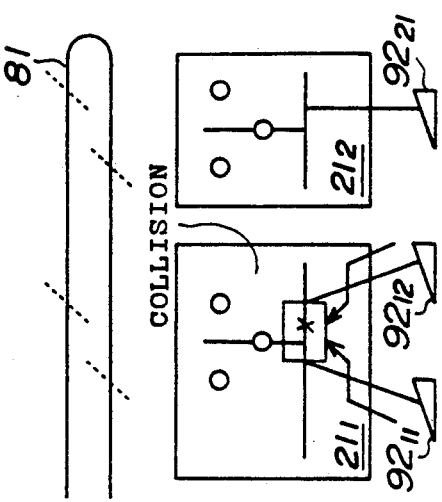

OPTICAL TRANSCEIVER

BACKGROUND OF THE INVENTION

The present invention generally relates to optical transceivers, and more particularly to an optical transceiver which uses a U-shaped optical bus as its transmission line and carries out a control dependent on packet collision in a local area network (LAN) which employs carrier sense multiple access with collision detection CSMA/CD).

The LAN which uses the U-shaped optical bus as its transmission line is virtually unaffected by external noise when compared to the conventional system which uses a metal cable as its transmission line. In addition, the restrictions on the design of the LAN system is relatively small.

FIG. 1 shows an example of a conventional LAN which uses the U-shaped optical bus as its transmission line and employs the CSMA/CD. In FIG. 1, a plurality of optical transceivers $80_1$ through $80_N$ are arranged on a U-shaped optical bus 81. Each optical transceiver $80_i$ is made up of a photocoupler $82_i$ for making a photoelectric conversion in correspondence with the going and returning paths of the optical bus 81, and a coder/decoder part $83_i$ which codes and decodes the electric signal, where i=1 to N.

In each coder/decoder part $83_i$, an output of the photocoupler $82_i$ which is provided in the going path of the optical bus 81 is coupled to a receiving internal bus $87_1$ via a Manchester decoder 84, a clock adjusting circuit 85 and one channel of a serial interface adapter 86. The Manchester decoder 84 decodes a Manchester code included in an output signal of the photocoupler $82_i$ which is provided in the going path of the optical bus 81 into an non-return-to-zero (NRZ) signal. The clock adjusting circuit 85 absorbs the difference in the accuracies of a clock in the optical bus 81 and a clock within the coder/decoder part $83_i$.

In addition, in each coder/decoder part $83_i$, a transmitting internal bus $87_2$ which forms a pair with the receiving internal bus $87_1$ is coupled to a clock adjusting circuit 88 via another channel of the serial interface adapter 86. An output of the clock adjusting circuit 88 is coupled to an input of the photocoupler $82_i$ which is provided in the returning path of the optical bus 81, via a Manchester encoder 89 which codes the NRZ signal into the Manchester code. On the other hand, the receiving internal bus $87_1$ is coupled to a level shift circuit 90 which notifies a packet collision generated on the optical bus 81 to each data terminal by shifting the level at the receiving internal bus $87_1$. The internal buses $87_1$ and $87_2$ are coupled to each data terminal 92 via an AUI cable prescribed under ISO8802-3 and a transceiver module 94.

In the conventional LAN described above, packets which are simultaneously transmitted from a plurality of optical transceivers may collide on the optical bus 81. However, in each of the coder/decoder parts $83_1$ through $83_N$, two internal buses $87_1$ and $87_2$ are provided in order to avoid data collision on the internal bus, and the level shift circuit 90 is provided to notify the packet collision generated on the optical bus 81 to each data terminal. For this reason, there is a problem in that the hardware scale is large in the conventional LAN.

SUMMARY OF THE INVENTION

Accordingly, it is a general object of the present invention to provide a novel and useful optical transceiver in which the problem described above is eliminated.

Another and more specific object of the present invention is to provide an optical transceiver which is coupled to a U-shaped optical bus and to data terminals employing carrier sense multiple access with collision detection (CSMA/CD), comprising serial-parallel converting means for carrying out a conversion between data to and from the data terminals and transmitting packets to be transmitted from and receiving packets to be received by the data terminals via the serial-parallel converting means, optical bus interface means for matching the transmitting and receiving packets to the U-shaped optical bus which is used as a transmission line, a common bus which provides a data transfer path between the serial-parallel converting means and the data terminals during transmitting and receiving operations, transmitting packet intermission means, coupled between the optical interface means and the serial-parallel converting means, for intermitting the transmitting packets in response to a transmission control signal, receiving packet intermission means, coupled between the optical interface means and the serial-parallel converting means, for intermitting the receiving packets in response to a reception control signal, and control means, coupled between the optical interface means and the serial-parallel converting means, for generating the transmission control signal and the reception control signal based on timings of the transmitting packet and the receiving packet, a relationship between the transmitting packet and a corresponding receiving packet which is looped back from the U-shaped optical bus, and a collision notification, wherein the serial-parallel converting means includes notifying means for notifying a collision on the common bus based on an impedance of the common bus by supplying the collision notification to the control means. According to the optical transceiver of the present invention, it is unnecessary to provide a level shift circuit, and the common bus is used in common during the transmitting and receiving operations. As a result, the hardware scale of the optical transceiver is effectively reduced compared to that of the conventional optical transceiver, and the optical transceiver according to the present invention is suited for production in the form of an LSI.

Other objects and further features of the present invention will be apparent from the following detailed description when read in conjunction with the accompanying drawings.

BRIEF DESCRIPTION OF THE DRAWINGS

FIG. 4 is a system block diagram showing an embodiment of a transmitter/receiver controller of the optical transceiver shown in FIG. 3;

FIGS. 5A through 5F are diagrams for explaining a transmitting/receiving operation of the embodiment when no collision is generated;

FIGS. 6A through 6F are diagrams for explaining an operation of the embodiment when a collision is generated on an optical bus;

FIGS. 7A through 7C are diagrams for explaining an operation of the embodiment when a collision is generated on a common bus; and FIGS. 8A through 8C are diagrams for explaining an operation of the embodiment when a collision is generated on the common bus due to simultaneous transmission from a plurality of data terminals.

DESCRIPTION OF THE PREFERRED EMBODIMENTS

First, a description will be given of an operating principle of an optical transceiver according to the present invention, by referring to FIG. 2.

Figure 2:
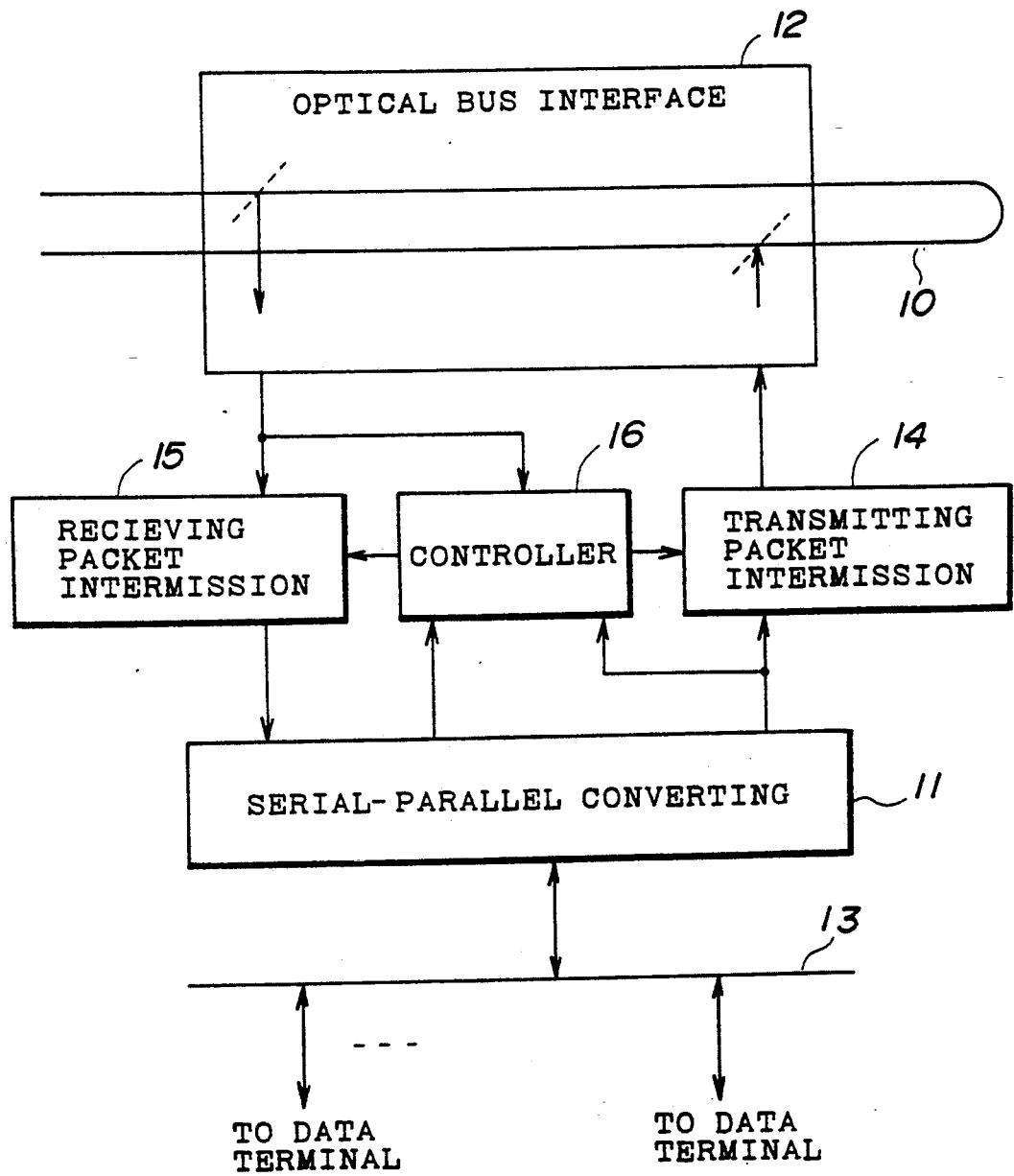
FIG. 2 is a system block diagram for explaining an operating principle of an optical transceiver according to the present invention.

In FIG. 2, a serial-parallel converter 11 converts receiving packets into data to be received by a data terminal (not shown) which employs the CSMA/CD and converts data transmitted from the data terminal into transmitting packets. An optical bus interface 12 adjusts a U-shaped optical bus 10 which is used as the transmission line to the transmitting and receiving packets. A common bus 13 functions as a data transfer line between the data terminal and the serial-parallel converter 11 when carrying out transmitting and receiving operations.

A transmitting packet intermission part 14 intermits the transmitting packets in response to a transmission control signal. A receiving packet intermission part 15 intermits the receiving packets in response to a reception control signal. A controller 16 generates the transmission control signal and the reception control signal based on the timings of the transmitting and receiving packets, the relationship between the transmitting packet and the corresponding receiving packet which is looped back by the U-shaped optical bus 10 and a notification regarding a collision on the common bus 13. The serial-parallel converter 11 sends the notification regarding the collision on the common bus 13 based on the impedance of the common bus 13.

During the transmitting operation, the serial-parallel converter 11 converts the data which is received from the data terminal via the common bus 13 into transmitting packets. The controller 16 detects the head of the transmitting packet and transmits the transmission control signal. The transmitting packet intermission part 14 supplies the transmitting packets received via the serial-parallel converter 11 to the optical bus interface 12 in response to the transmission control signal. The optical bus interface 12 matches the transmitting packets to the U-shaped optical bus 10 which is used as the transmission line, and transmits the transmitting packets to the U-shaped optical bus 10. In addition, the controller 16 maintains the transmission control signal as it is when the transmitting packet which is transmitted matches the corresponding receiving packet which is looped back and received from the U-shaped optical bus 10. Furthermore, when the controller 16 detects a tail of the transmitting packet, the controller 16 stops generating the transmission control signal so that the transmitting packet intermission part 14 returns to the original state before the start of the transmission.

On the other hand, during the receiving operation, the receiving packets received from the U-shaped optical bus 10 are supplied to the controller 16 via the optical bus interface 12. The controller 16 transmits the reception control signal when a head of the receiving packet is detected. The receiving packet intermission part 15 supplies the receiving packets to the serial-parallel converter 11 in response to the reception control signal. The serial-parallel converter 11 converts the receiving packets into a predetermined data, and the predetermined data is supplied to the data terminal via the common bus 13. Furthermore, the controller 16 stops generating the reception control signal when a tail of the receiving packet is detected so that the receiving packet intermission part 15 returns to the original state before the start of the reception.

Accordingly, during the transmitting and receiving operations in which no packet collision is generated, the controller 16 activates one of the transmitting packet intermission part 14 and the receiving packet intermission part 15 depending on the timing difference between the transmitting packet and the receiving packet.

The controller 16 recognizes a packet collision on the U-shaped optical bus 10 when the controller 16 detects that the transmitting packet and the corresponding receiving packet looped back from the U-shaped optical bus 10 differ during the transmitting operation. In this case, the controller 16 generates the reception control signal to activate the receiving packet intermission part 15. Since the serial-parallel converter 11 supplies the data to the common bus 13 depending on the receiving packet which is received via the receiving packet intermission part 15, a collision is generated on the common bus 13 between the data from the serial-parallel converter 11 and the data from the data terminal. On the other hand, the data terminal transmits a jam signal responsive to this collision on the common bus 13, and the other optical transceivers which are located on the other side of the U-shaped optical bus 10 similarly transmit a jam signal to the U-shaped optical bus 10. The controller 16 stops generating the transmission control signal when a tail of the jam signal which is transmitted from the data terminal is detected, and stops generating the reception control signal when a tail of the jam signal which is received from the U-shaped optical bus 10 is detected. The transmitting packet intermission part 14 and the receiving packet intermission part 15 are thus respectively returned to their original states before the start of the transmission.

On the other hand, when the data terminal starts the transmitting operation after the receiving packet intermission part 15 is activated depending on the receiving packet which is received from the U-shaped optical bus 10, a collision is generated on the common bus 13 between the data from the data terminal and the data from the serial-parallel converter 11. The serial-parallel converter 11 transmits a common bus collision notification which notifies a collision on the common bus 13, depending on the impedance of the common bus 13 at the time when such a collision occurs. The controller 16 activates the transmitting packet intermission part 14 in response to the common bus collision notification, and thus, a packet collision is generated on the U-shaped optical bus 10. The data terminal transmits a jam signal depending on the collision on the common bus 13. Thereafter, the transmitting packet intermission part 14 and the receiving packet intermission part 15 are respectively returned to their original states before the start of the transmission under the control of the controller 16, according to a procedure similar to that used when a collision is generated on the common bus 13 after a packet collision is generated on the U-shaped optical bus 10.

In addition, when a plurality of data terminals arranged on the common bus 13 start the transmitting operations simultaneously, a collision is generated on the common bus 13 among the data from the data terminals. The serial-parallel converter 11 transmits a common bus collision notification depending on the impedance of the common bus 13 at the time when such a collision occurs. The controller 16 activates the transmitting packet intermission part 14 and the receiving packet intermission part 15 simultaneously in response to the common bus collision notification, and thus, a packet collision is generated on the U-shaped optical bus 10. On the other hand, each data terminal transmits a jam signal depending on the collision generated on the common bus 13. Thereafter, the parts of the optical transceiver return to their original states before the start of the transmission according to a procedure similar to that described above.

Figure 1:
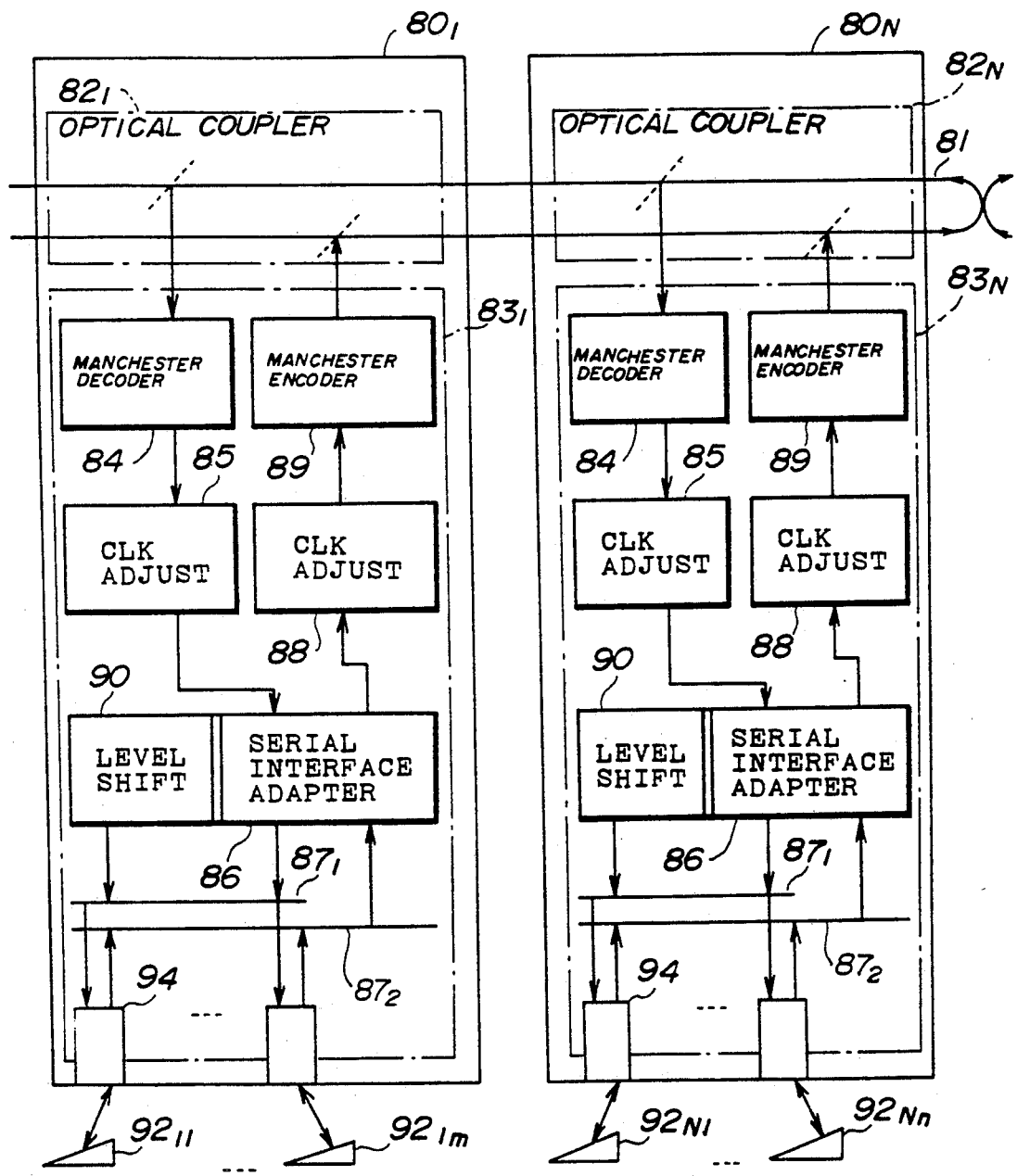
FIG. 1 is a system block diagram showing an example of a conventional LAN.

Therefore, according to the present invention, the optical transceiver uses the common bus 13 which is used in common for the transmitting and receiving operations, and there is no need to provide a level shift circuit as in the case of the conventional optical transceiver shown in FIG. 1.

Figure 3:
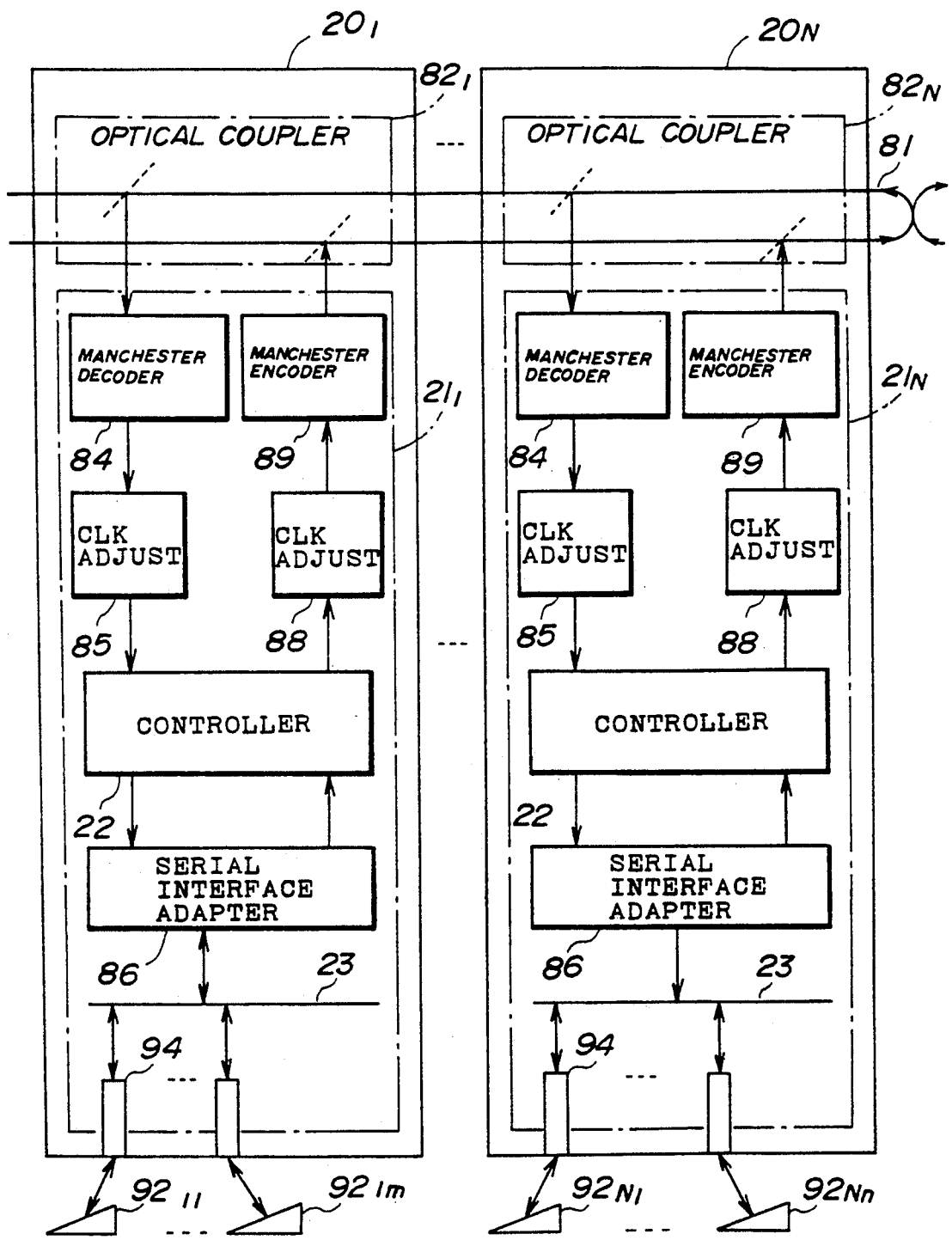
FIG. 3 is a system block diagram showing an embodiment of the optical transceiver according to the present invention.

Next, a description will be given of an embodiment of the optical transceiver according to the present invention, by referring to FIG. 3. In FIG. 3, those parts which are the same as those corresponding parts in FIG. 1 are designated by the same reference numerals, and a description thereof will be omitted.

In FIG. 3, optical transceivers $20_1$ through $20_N$ are provided in place of the optical transceivers $80_1$ through $80_N$ shown in FIG. 1, and coder/decoder parts $21_1$ through $21_N$ are provided in place of the coder/decoder parts $83_1$ through $83_N$ shown in FIG. 1. In addition, in FIG. 3, each coder/decoder part $21_i$ is characterized in that a transmitter/receiver controller 22 is arranged between the serial interface adapter 86 and the clock adjusting circuits 85 and 88, and that a common bus 23 which is used in common for the transmitting and receiving operation is provided in place of the internal buses $87_1$ and $87_2$ shown in FIG. 1. Furthermore, each coder/decoder part $21_i$ does not include the level shift circuit 90 shown in FIG. 1.

For example, the serial interface adapter 86 may be realized using an LSI AM7992B manufactured by AMD and an LSI ULA022 manufactured by TDK. In addition, the transceiver module 94 may be realized using an LSI ULA020 manufactured by TDK.

FIG. 4 shows an embodiment of the transmitter/receiver controller 22 shown in FIG. 3. In FIG. 4, a transmitting data (packet) which is received from the serial interface adapter 86 is supplied to one input terminal of a transmission switch part (AND gate) 32 via a transmitting data detector 31. An output of the transmitting switch part 32 is supplied to a first input terminal of a transmission/reception monitoring part 33 and the clock adjusting circuit 88. A receiving data (packet) which is received from the clock adjusting circuit 85 is supplied to a second input terminal of the transmission/reception monitoring part 33, and to one input terminal of a receiving switch part (AND gate) 35 via a receiving data detector 34. An output of the receiving switch part 35 is supplied to the serial interface adapter 86. The transmitting data detector 31 supplies to a transmission/reception selection signal generator 36 a signal which indicates head and tail of the transmitting data, while the receiving data detector 34 supplies to the transmission/reception select signal generator 36 a signal which indicates head and tail of the receiving data. The transmission/reception selection signal generator 36 generates a transmission selection signal and a reception selection signal based on the timings of the signals which are respectively received from the transmitting data detector 31 and the receiving data detector 34. The transmission selection signal is supplied to the other input terminal of the transmitting switch part 32, while the reception selection signal is supplied to the other input terminal of the receiving switch part 35. A collision detection signal which is output from the serial interface adapter 86 is supplied to a third input terminal of the transmission/reception monitoring part 33. An output of the transmission/reception monitoring part 33 is supplied to the transmission selection signal generator 36.

In this embodiment, the photocoupler $82_1$, the Manchester decoder 84, the Manchester encoder 89 and the clock adjusting circuits 85 and 88 correspond to the optical interface 12 shown in FIG. 2. The transmitting switch part 32 corresponds to the transmitting packet intermission part 14 shown in FIG. 2, and the receiving switch part 35 corresponds to the receiving packet intermission part 15 shown in FIG. 2. The transmitting data detector 31, the transmission/reception monitoring part 33, the receiving data detector 34 and the transmission/reception selection signal generator 36 corresponds to the controller 16 shown in FIG. 2. Further, the serial interface adapter 86 corresponds to the serial-parallel converter 11 shown in FIG. 2, and the common bus 23 corresponds to the common bus 13 shown in FIG. 2.

Next, a description will be given of this embodiment of the optical transceiver, by referring to FIGS. 5 through 8.

FIGS. 5A through 5F are diagrams for explaining the transmitting and receiving operations of this embodiment when no collision is generated.

In the coder/decoder parts $21_1$ and $21_2$, the signals passing through the transmitting switch part 32 and the receiving switch part 35 are intermittently controlled by the transmission/reception selection signal generator 36 of the transmitter/receiver controller 22. However, for the sake of convenience, FIGS. 5A through 5F show the states of the transmitting switch part 32 and the receiving switch part 35 in a simplified manner, that is, as connection states of the common bus 23 and the U-shaped optical bus 81. Such illustrations of the states of the transmitting switch part 32 and the receiving switch part 35 are also employed in FIGS. 6 through 8 which will be described later.

Figure 5B:
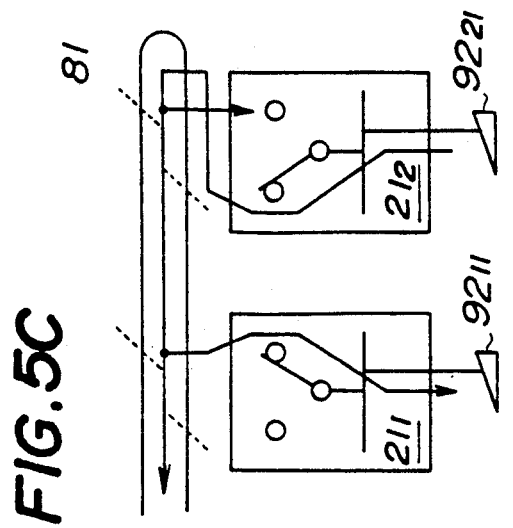
Figure 5E:
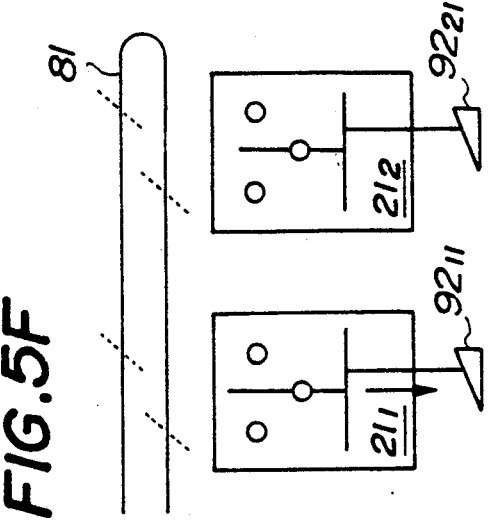
Figure 5B:
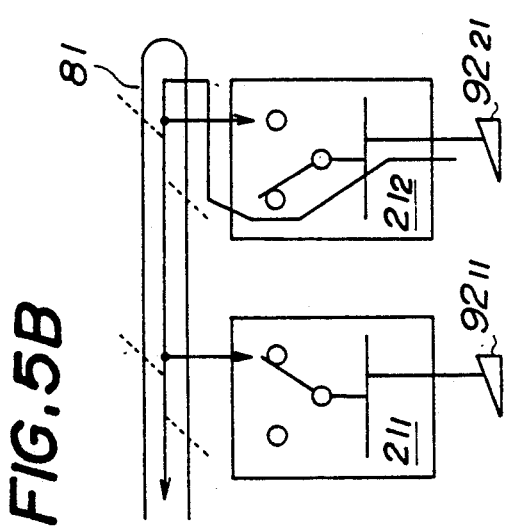
Figure 5E:
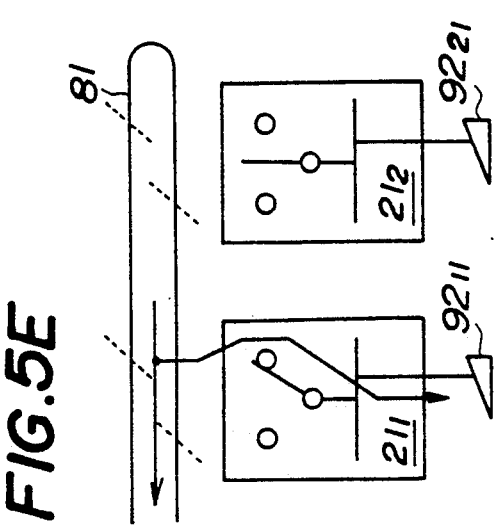
Figure 5A:
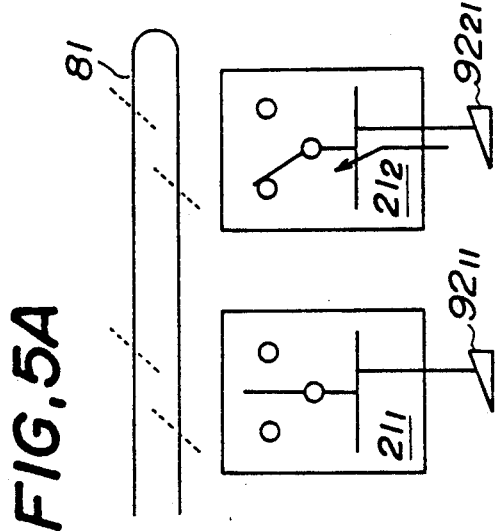

When a data terminal $92_{21}$ transmits a transmitting data (packet) in a state where all of the optical transceivers arranged on the U-shaped optical bus 81 are not transmitting, the transmission/reception selection signal generator 36 of the coder/decoder part $21_2$ activates, that is, turns ON, the transmitting switch part 32 as shown in FIG. 5A when the head of this transmitting data is detected. In addition, the transmission/reception monitoring part 33 enters the transmitting data on the U-shaped optical bus 81 via the photocoupler $82_2$, and confirms that no packet collision is genera&ed on the U-shaped optical bus 81 by collating the contents of the entered transmitting data with those of the transmitting data.

On the other hand, at the coder/decoder part $21_1$, the transmission/reception selection signal generator 36 activates, that is, turns ON, the receiving switch part 35 when the head of a receiving data (packet) is detected as shown in FIG. 5B, and supplies the receiving data to a data terminal $92_{11}$ as shown in FIG. 5C.

Figure 5D:
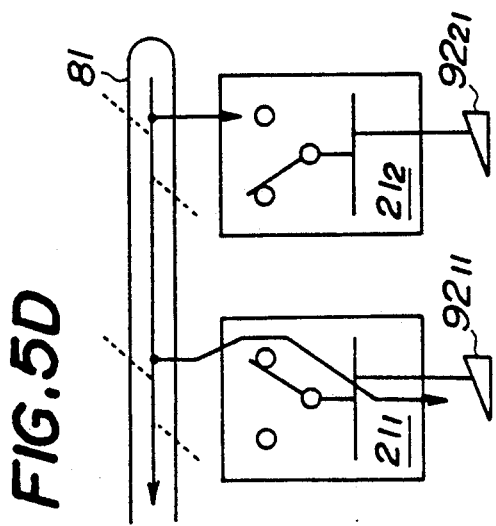

When the transmitting data detector 31 detects the tail (transmission complete) of the transmitting data, the transmitting switch part is deactivated, that is, turned OFF, as shown in FIGS. 5D and 5E. In addition, at the coder/decoder part $21_1$, the receiving switch part 35 is deactivated, that is, turned OFF, when the receiving data detector 34 detects the tail (reception complete) of the receiving data as shown in FIG. 5F. As a result, the transmitting and receiving operation with respect to a single data (packet) is completed.

FIGS. 6A through 6F are diagrams for explaining the operation of this embodiment when a collision is generated on the U-shaped optical bus 81.

The transmission/reception monitoring part 33 of each optical transceiver stores 512 bits including an address field of the transmitting data (packet) into a memory (not shown) when carrying out the transmitting operation. The transmission/reception monitoring part 33 enters the transmitting data on the U-shaped optical bus 81 via the photocoupler $82_i$, and detects a data error by comparing the entered transmitting data and the transmitting data stored in the memory bit by bit. The detection of the data error corresponds to the detection of the packet collision on the U-shaped optical bus 81.

In other words, when the transmitting data from the coder/decoder parts $21_1$ and $21_2$ collide on the U-shaped optical bus 81 as shown in FIG. 6A, the transmission/reception monitoring part 33 of each of the coder/decoder parts $21_1$ and $21_2$ notifies the above comparison result to the corresponding transmission/reception select signal generator 36. The transmission/reception select signal generator 36 turns ON the transmitting switch part 32 and the receiving switch part 35 simultaneously in response to this notification from the transmission/reception monitoring part 33 as shown in FIGS. 6B and 6C.

At the coder/decoder parts $21_1$ and $21_2$, the serial interface adapter 86 transmits a predetermined data on the common bus 23 according to such a control operation, and the data from the serial interface adapter 86 and the data from the transmitting data terminal collide on the common bus 23. The data terminals $92_{11}$ and $92_{21}$ respectively detect such a collision via the AUI cable and transmit a jam signal during a jam time.

At the coder/decoder parts $21_1$ and $21_2$, the transmitting data detector 31 detects the stop of the jam signal transmission and turns OFF the transmitting switch part 32 as shown in FIG. 6D. Furthermore, the receiving data detector 34 detects the tail of the jam signal which is received from the optical transceiver which is located on the other side of the U-shaped optical bus 81, and turns OFF the receiving switch part 35 as shown in FIGS. 6E and 6E so as to return to the original state before the start of the transmission.

FIGS. 7A through 7C are diagrams for explaining the operation of this embodiment when a collision is generated on the common bus 23.

The transmitting data detector 31 of the coder/decoder part $21_1$ detects the head of the transmitting data (packet) and turns ON the transmitting switch part 32 as shown in FIG. 7A when the data terminal $92_{11}$ starts transmitting in a state where no optical transceiver makes a transmission. On the other hand, at the coder/decoder part $21_2$, the receiving data detector 34 turns ON the receiving switch part 35 when the receiving data detector 34 detects the head of the receiving data (packet) which corresponds to the above transmitting data. But when the data terminal $92_{21}$ simultaneously starts transmitting, the data from the serial interface adapter 86 and the data from the data terminal $92_{21}$ collide on the common bus 23 as shown in FIG. 7B.

The serial interface adapter 86 detects this collision on the common bus 23 based on the impedance of the common bus 23, and transmits a collision detection signal to the transmission/reception monitoring part 33. The transmission/reception monitoring part 33 supplies a predetermined control signal to the transmission/reception selection signal generator 36 in response to this collision detection signal, and the transmission/reception selection signal generator 36 turns ON the transmitting switch part 32 in response to this predetermined control signal as shown in FIG. 7C. In addition, the data terminal $92_{21}$ detects this collision on the common bus 23 and transmits a jam data. As a result, a packet collision is generated on the U-shaped optical bus 81.

The coder/decoder part $21_1$ recognizes the collision on the common bus 23 in the coder/decoder part $21_2$ indirectly from the collision on the U-shaped optical bus 81, and returns to the original state before the start of the transmission according to the procedure described above in conjunction with FIGS. 6C through 6F. Furthermore, the coder/decoder part $21_2$ returns to the original state before the start of the transmission according to the procedure described above in conjunction with FIGS. 6D through 6F.

FIGS. 8A through 8C are diagrams for explaining the operation of this embodiment when a collision is generated on the common bus 23 due to simultaneous transmission from a plurality of data terminals.

When the data terminals $92_{11}$ and $92_{12}$ which are coupled to the coder/decoder part $21_1$ simultaneously make transmissions, the data from the data terminals $92_{11}$ and $92_{12}$ collide on the common bus 23 as shown in FIG. 8A. The serial interface adapter 86 detects this collision on the common bus 23 and transmits a collision detection signal to the transmission/reception monitoring part 33. The transmission/reception monitoring part 33 supplies a predetermined control signal to the transmission/reception selection signal generator 36 in response to this collision detection signal, and the transmission/reception selection signal generator 36 turns ON the transmitting switch part 32 and the receiving switch part 35 in response to the predetermined control signal.

On the other hand, the data terminals $92_{11}$ and $92_{12}$ detect this collision on the common bus 23 and transmit jam data as shown in FIGS. 8B and 8C. Each optical transceiver returns to the original state before the start of the transmission according to the procedure described above in conjunction with FIGS. 6D through 6F according to the transmission end of the jam data.

Therefore, according to this embodiment, the optical transceiver does not require the level shift circuit which was conventionally required to notify the generation of the packet collision on the U-shaped optical bus, and the two internal buses which were conventionally required can be replaced by a single common bus which is used in common for the transmitting and receiving operations.

Of course, by omitting the common bus 23, the transceiver modules 94 and the data terminals 92, and coupling the serial interface adapter 86 to a coaxial cable, the coder/decoder part 21 may be used as a repeater.

Further, the present invention is not limited to these embodiments, but various variations and modifications may be made without departing from the scope of the present invention.

What is claimed is:

1. An optical transceiver which is coupled to a U-shaped optical bus used as a transmission line for a transmission of receiving and transmitting packets to and from the optical transceiver and also coupled to data terminals employing carrier sense multiple access with collision detection (CSMA/CD), said optical transceiver comprising:
   optical bus interface means coupled to the U-shaped optical bus for matching the transmitting and receiving packets to the U-shaped optical bus;
   converting means for receiving corresponding receiving packets from the U-shaped optical bus and converting the corresponding receiving packets into data to be transferred to a respective data terminal and for receiving data from a respective data terminal and converting said data into corresponding transmitting packets to be transferred to the U-shaped optical bus;
   a common bus connected between said converting means and said data terminals to provide a data transfer path between said converting means and the data terminals during transmitting and receiving operations;
   said converting means including notifying means for notifying a collision on said common bus based on an impedance of said common bus;
   control means, coupled between said optical bus interface means and said converting means, for generating a transmission control signal and a reception control signal based on timings of a transmitting packet and a receiving packet being transmitted, a relationship between the transmitting packet and a corresponding receiving packet which is looped back from the U-shaped optical bus, and a collision notification supplied from said notifying means of said converting means;
   transmitting packet intermission means, coupled between said optical bus interface means and said converting means, for intermitting the transmitting packets in response to said transmission control signal; and
   receiving packet intermission means, coupled between said optical bus interface means and said converting means, for intermitting the receiving packets in response to said reception control signal.

2. The optical transceiver as claimed in claim 1, wherein, during the transmitting operation, said converting means converts the data which is received from the respective data terminal via said common bus into the transmitting packets, said control means detects a head of the transmitting packet and transmits the transmission control signal, and said transmitting packet intermission means supplies the transmitting packets received via said converting means to said optical bus interface means in response to the transmission control signal.

3. The optical transceiver as claimed in claim 2, wherein, during the transmitting operation, said optical bus interface means matches the transmitting packets to the U-shaped optical bus and transmits the transmitting packets to the U-shaped optical bus.

4. The optical transceiver as claimed in claim 3, wherein, during the transmitting operation, said control means maintains the transmission control signal as it is when the transmitting packet which is transmitted matches the corresponding receiving packet which is looped back and received from the U-shaped optical bus.

5. The optical transceiver as claimed in claim 4, wherein, when the control means detects a tail of the transmitting packet, said control means stops generating the transmission control signal so that said transmitting packet intermission means returns to an original state before a start of the transmitting operation.

6. The optical transceiver as claimed in claim 1, wherein, during the receiving operation, the receiving packets received from the U-shaped optical bus are supplied to the control means via said optical bus interface means, said control means transmits the reception control signal when a head of the receiving packet is detected, said receiving packet intermission means supplies the receiving packets to said converting means in response to the reception control signal, said converting means converts the receiving packets into a predetermined data, and the predetermined data is supplied to the respective data terminal via said common bus.

7. The optical transceiver as claimed in claim 6, wherein said control means stops generating the reception control signal when a tail of the receiving packet is detected so that said receiving packet intermission means returns to an original state before a start of the receiving operation.

8. The optical transceiver as claimed in claim 1, wherein said control means recognizes a packet collision on the U-shaped optical bus when said control means detects that the transmitting packet and the corresponding receiving packet looped back from the U-shaped optical bus differ during the transmitting operation.

9. The optical transceiver as claimed in claim 8, wherein said control means generates the reception control signal to activate said receiving packet intermission means when said control means recognizes the packet collision on the U-shaped optical bus, thereby generating a collision on said common bus between the data from said converting means and the data from the respective data terminal.

10. The optical transceiver as claimed in claim 9, wherein the respective data terminal transmits a jam signal responsive to the collision on said common bus and other optical transceivers which are located on the other side of the U-shaped optical bus to transmit a jam signal to the U-shaped optical bus.

11. The optical transceiver as claimed in claim 10, wherein said control means stops generating the transmission control signal when a tail of the jam signal which is transmitted from the data terminal is detected, and stops generating the reception control signal when a tail of the jam signal which is received from the U-shaped optical bus is detected, thereby returning said transmitting packet intermission means and said receiving packet intermission means to original states before a start of the transmitting operation.

12. The optical transceiver as claimed in claim 1, wherein said optical bus interface means includes:
- a photocoupler which is coupled to the U-shaped optical bus;
- a Manchester encoder, coupled to the photocoupler, for coding the transmitting packets;
- a Manchester decoder, coupled to the photocoupler, for decoding the receiving packets; and
- clock adjusting means, coupled between said control means and the Manchester encoder and decoder, for adjusting a difference in accuracies of a clock on the U-shaped optical bus and a clock within the optical transceiver.

13. The optical transceiver as claimed in claim 1, wherein said control means includes:
- a transmitting data detector, coupled to said converting means, for supplying a signal which indicates heads and tails of the transmitting packets;
- receiving data detector, coupled to said converting means, for supplying a signal which indicates heads and tails of the receiving packets; and
- a transmission/reception control signal generator for generating the transmission control signal and the reception control signal based on the timings of the signals which are respectively received from the transmitting data detector and the receiving data detector.

14. The optical transceiver as claimed in claim 13, wherein said control means further includes a transmission/reception monitoring part, coupled to said optical bus interface means, for monitoring the transmitting and receiving packets, said transmission/reception monitoring part supplying a control signal to said transmission/reception control signal generator in response to the collision notification from said converting means.

* * * * *